United States Patent [19]
Reynolds

[11] 3,912,957
[45] Oct. 14, 1975

[54] DYNAMOELECTRIC MACHINE STATOR ASSEMBLY WITH MULTI-BARREL CONNECTION INSULATOR

[75] Inventor: Hugh B. Reynolds, Rome City, Ind.

[73] Assignee: General Electric Company, Fort Wayne, Ind.

[22] Filed: Dec. 27, 1973

[21] Appl. No.: 428,844

[52] U.S. Cl. ............ 310/71; 310/45; 310/260; 174/88
[51] Int. Cl.² ........................................ H02K 11/00
[58] Field of Search ......... 310/214, 180, 215, 184, 310/260, 194, 270, 210, 71, 214, 45, 208, 179, 271; 29/606; 174/88, 88 A, 88 B, 88 C; 138/128

[56] References Cited
UNITED STATES PATENTS

| 1,165,141 | 12/1915 | Sprong | 174/88 |
| 1,227,211 | 5/1917 | Sprong | 174/88 |
| 2,169,097 | 8/1939 | Hall | 310/45 |
| 2,937,228 | 5/1960 | Robinson | 174/88 C |
| 3,187,088 | 6/1965 | Warner | 174/88 |
| 3,219,857 | 11/1965 | Fisher | 310/215 |
| 3,293,463 | 12/1966 | Church | 310/71 |
| 3,312,250 | 4/1957 | Sirignano | 138/128 |
| 3,457,442 | 7/1969 | Charlton | 310/71 |
| 3,748,510 | 7/1973 | McNeal | 310/71 |

Primary Examiner—R. Skudy
Attorney, Agent, or Firm—Ralph E. Krisher, Jr.

[57] ABSTRACT

Single body of insulation for insulating one or more external lead wire connections in an area of end turn region having a paucity of end turns. Insulator may be used to anchor lead wires and may be fabricated of a sheet insulating material, for example by employing seam welding process. Insulator material defines a plurality of axially extending insulating compartments that receive external lead wires and winding tap wires. Each compartment is laterally separated from at least one adjacent compartment by at least one layer of insulating material. Insulator may comprise a plurality of independent tubular sleeves held together by a common exterior tubular sleeve. Insulator may include plurality of insulating compartments that are defined by a single or common sheet of insulating material.

4 Claims, 13 Drawing Figures

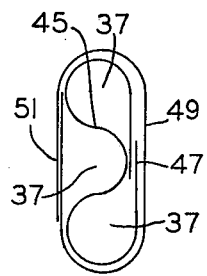 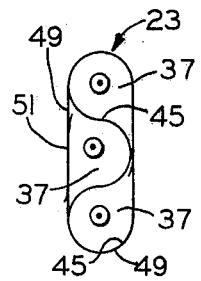 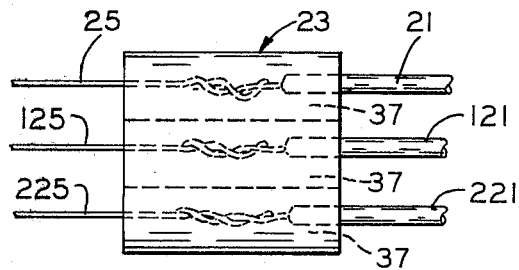
FIG. 4a     FIG. 4b     FIG. 4c
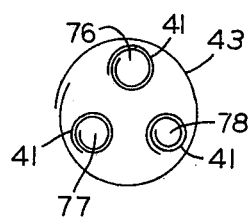 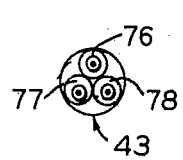 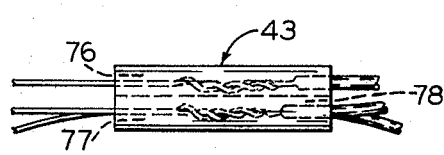
FIG. 5a     FIG. 5b     FIG. 5c
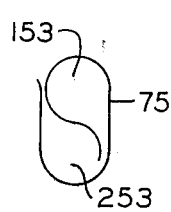 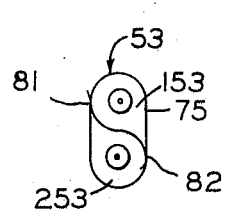 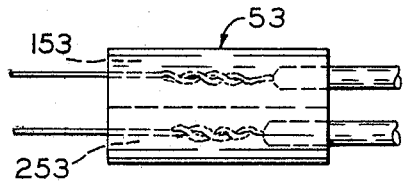
FIG. 6a     FIG. 6b     FIG. 6c
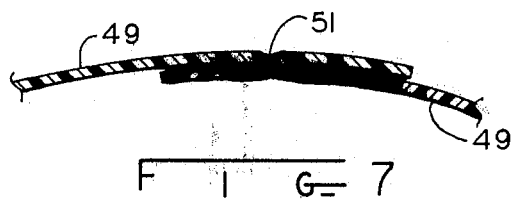
FIG. 7

DYNAMOELECTRIC MACHINE STATOR ASSEMBLY WITH MULTI-BARREL CONNECTION INSULATOR

BACKGROUND OF THE INVENTION

The present invention relates generally to connection insulators and electric motor parts having improved insulated winding connection arrangements.

As is well known in the art, a dynamoelectric machine stator may comprise a slotted core of magnetic material having a plurality of coils of conductive wire disposed in those slots with portions of the coils extending beyond one or both of the core end faces. These end portions of the coils are usually called "end turns." Windings for each pole of each winding phase are each formed of a coil group that includes one or more coils that each have one or more turns. The windings for each pole of each phase winding usually include at least two "tap wires," i.e., the ends of the windings of a pole that are to be connected to a source of energization voltage. While some of the tap wires of a given stator winding may be interconnected to form what is sometimes called a "cross-over" connection, at least two, and usually three or more tap wires must be connected to conductors for supplying electrical energy to the winding. These conductors usually are multi-stranded provided with relatively heavy insulation, and extend from the stator to facilitate supplying power to the stator windings. All forms of connections that are made must, of course, somehow be insulated.

It is known in the prior art to provide sleeve type insulators for connections made to winding leads ("tap windings"), for example as disclosed in the Hall et al U.S. Pat. No. 2,169,097, and Fisher U.S. Pat. No. 3,219,857. Other arrangements are discussed and shown in co-pending application Ser. No. 333,786.

In the aforementioned two United States Patents and co-pending application, the disclosures of each of which are specifically incorporated herein by reference, individual connections between "supply" or "external" lead wires and tap wires occur at different locations about the stator. In other words, a plurality of individual connections and insulators at diverse points within the machine are required to insulate the connections to the external lead wires. This may require the use of extra supply wire material within the motor and this of course is expensive. In addition, the end turns of electric motor stators often must be confined within a designated volume or "envelop." This is particularly the case with stators that are to be hermetically sealed within a compressor to be used for refrigeration purposes.

Whenever the end turn envelope size and shape must be closely controlled, any extra material (such as external lead wires and connections) within the envelope makes it more difficult to keep the envelope size and shape within desired limits. Often, the material in the envelope will be pressed and compacted in order to stay within such limits. When crimp type or brazed connections are present, such pressing may contribute to the undesirable puncture of electrical insulating material. It would be desirable to provide insulators that would better withstand the forces involved in pressing procedures that are used in practice. It also would be desirable to provide, when possible, arrangements that reduce (or prevent) the occurrence of lead wires and connections in those parts of end turn envelopes that are apt to be relatively more tightly compressed.

It is one object of the present invention to provide a single multiconnection insulator for insulating a number of connections between external lead wires and windings.

It is another object of the present invention to eliminate interference between individual connection insulation tubes and internal lead cable.

It is a further object of the present invention to reduce material bulk in dynamoelectric machine stators, thereby reducing defects caused by "over pressing" unusually bulky end turn regions.

Yet another object of the present invention is to achieve one or more of the foregoing objects by eliminating internal lead connecting wires.

In forming the connections between external lead wires and tap wires (and sometimes the connections between at least two tap wires) insulation is removed from the wires to be connected; and the bare wires then wound or twisted one about the other and brazed, welded, or soldered to form a secure mechanical and electrical bond therebetween. At other times these wires are connected by employing a mechanical crimp type connector; but in either event a joint larger than either of the wires and often with protruding, possibly sharp portions, is created. Such enlarged connection joints and joint insulation, as well as large internal lead cable (i.e., internally located portions of external lead wires), are prone to cause problems in end turn forming processes and are a major source of surge failures from shorted end turns and punctured connection insulating sleeves--particularly after these areas of excess materials have been pressed.

It is, of course, also desirable to securely anchor the external lead wires to the stator.

Thus another object of the present invention is to provide an arrangement such that excess lead and connection material in the end turn regions may be reduced, if not eliminated, while a secure anchoring of one or more external lead wires is maintained.

Still another object of the present invention is to reduce the amount of external lead wire that need be used for a given application and to facilitate the location of a plurality of connections at a single location.

SUMMARY OF THE INVENTION

In carrying out the above and other objects of the invention in one form, I provide a single body of insulation for insulating one or more external lead wire connections in an area of the end turn region having a paucity of end turns. This insulator may be used to anchor the lead and may be fabricated of a sheet insulating material, for example by employing a seam welding process as disclosed in commonly assigned copending application Ser. No. 333,786 of W. P. McNeal, which issued as U.S. Pat. No. 3,880,194 on Apr. 29, 1975. The insulator itself comprises a plurality of axially extending insulating compartments that are open at opposite ends to receive external lead wires and one or more winding tap wires. Each compartment is laterally separated from at least one adjacent compartment by at least one layer of insulating material. In one embodiment, the insulator comprises a plurality of independent tubular sleeves held together by a common exterior tubular sleeve, and in another embodiment the plurality of insulating compartments are formed from a single or common sheet of insulating material.

The subject matter which I regard as my invention, is particularly pointed out and distinctly claimed in the concluding portion of this specification. My invention itself however, together with further objects and advantages thereof, may best be understood by reference to the following description taken in conjunction with the accompanying drawings wherein like reference numerals have been used to designate like parts.

BRIEF DESCRIPTION OF THE DRAWINGS

FIGS. 4a, 4b, and 4c illustrate in more detail (with some parts removed) a three compartment insulator that is shown in FIGS. 1–3;

FIGS. 5a, 5b, and 5c illustrate a three compartment insulator that may be used in lieu of the insulation of FIGS. 4a, 4b, and 4c;

FIGS. 6a, 6b, and 6c illustrate a two compartment insulator that might be used rather than the one of FIG. 4a; and FIG. 7 illustrates a seam weld employable in fabricating the insulators of FIGS. 4a, 5a, and 6a.

DESCRIPTION OF THE PREFERRED EMBODIMENT

Figure 1:
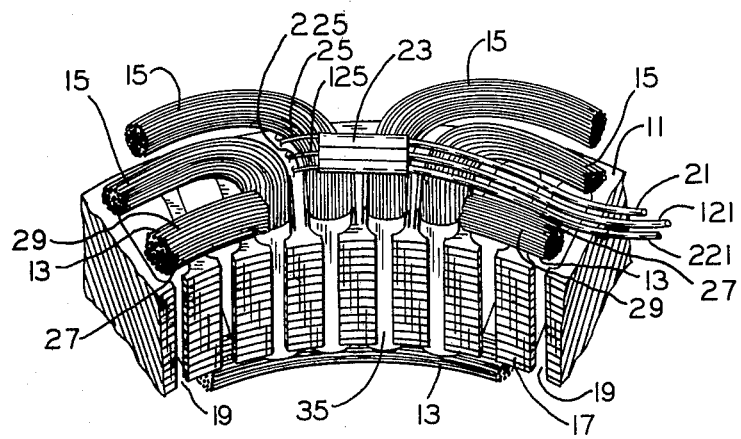
FIG. 1 illustrates in perspective, with parts removed and parts broken away, a stator assembly comprising a magnetic core and windings, and embodying the invention in one form thereof.

Referring now to the drawings in greater detail, FIG. 1 illustrates, in partially broken away perspective, a stator assembly that includes a slotted magnetic core 11, and at least first and second phase windings. The stator assembly actually shown includes a main winding and an auxiliary winding which is particularly useful during starting conditions. As will be understood, the auxiliary winding may continue to be energized during running conditions (as in the case of permanent capacitor single phase motor designs) or it may be de-energized after starting (e.g., as in the case of resistance start split-phase single phase motor designs).

Of course, stator assemblies embodying the present invention may be in the form three phase motors. Accordingly, it will be understood that all teachings presented herein, (while discussed specifically with respect to the stator assembly shown in FIG. 1), may be utilized in other designs or types of motors.

As clearly revealed in FIG. 1, the windings have side turn portions disposed in slots within core 11 and have end turn portions adjacent the end faces of the core. The core 11 is made of magnetic material and may be fabricated from a preselected number of laminations suitably punched from relatively thin magnetic sheet material. The laminations are retained in stacked juxtaposed relation, for example, by welding transversely across the stack periphery, by means of co-operating grooves and keys as is known in the art, or merely held together loosely by slot insulators. The core has spaced apart aligned teeth 17 which terminate at a rotor receiving bore. These teeth define the restricted entrances for a number of spaced apart winding accommodating slots 19.

A plurality of external insulated lead wires 21, 121, and 221 are provided for supplying electrical energy to tap wires (such as tap wires 25, 125, and 225) which, as will be understood, conduct current to the coils of the windings. The lead wires are connected (for example, by a mechanical crimp connection or by soldering, welding, or brazing) to the tap wires and such connections then are covered and protected by the walls of the insulator 23.

Each pole or coil group of the auxiliary winding 13 typically may comprise one or more coils 27 and 29 (which each comprise one or more winding turns). The coil groups of each pole of a given winding also are interconnected in desired series or parallel circuit relation, all as will be understood by persons skilled in the art.

Figure 2:
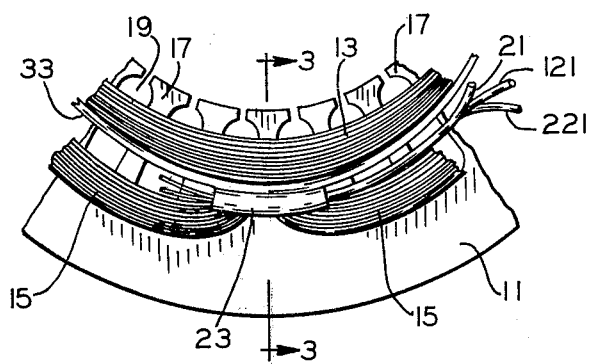
FIG. 2 is a plan view of a part of the structure of FIG. 1.
Figure 3:
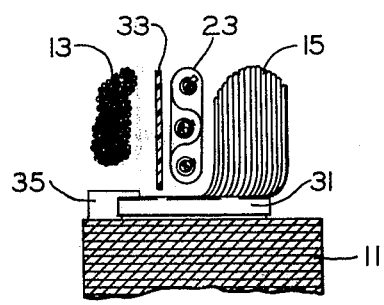
FIG. 3 is a cross-sectional view, with parts broken away and removed, taken along line 3—3 of FIG. 2.

Different configurations of multi-connection accommodating insulators may be provided. Referring specifically to FIGS. 1–3, a three connection receiving insulator has been shown, and one mode of assembling the stator assembly of FIGS. 1–3 will be described. Slots of the core first receive a stator slot liner 31. The main winding 15 is then typically inserted into preselected ones of the slots 19, followed by the insertion of auxiliary winding portions. Some of the slots may accommodate portions of an auxiliary coil as well as portions of a main winding coil. Thereafter (or substantially during insertion of the auxiliary winding), slot closure means such as wedges 35 may be inserted in the openings of the slots. After insertion of the main winding, and prior to insertion of the auxiliary winding, "between phase" insulation (e.g., plastic or paper sheet insulation 33) may be placed to provide an extra measure of insulation between the wires of the two winding phases.

The connection insulator 23 (see FIG. 3 and FIGS. 4a, 4b, and 4c) comprises or establishes three longitudinally extending compartments or barrels 37 which are open at two ends so as to receive therein the connected portions of a lead such as lead 21 and of a tap wire such as tap wire 25.

In the manufacture of the stator assembly of FIG. 1, a multi-compartmented connection protecting means in the form of insulator 23 may be placed or positioned on the external leads 21, 121, and 221 or on the tap wires 25, 125, 225. Thereafter, the external leads and tap wires are connected, and the insulator is positioned relative the connections as indicated by FIG. 4c. Alternatively, the connections may be made without regard to insulator 23 and then, after one or more connections are made, insulator 23 may be slipped over the free end of the one or more external lead wires, and into the protective position indicated by FIG. 4c.

The insulators depicted in FIGS. 4 through 6 each act as a common insulator for connections between two or more external lead wires and tap wires. All of the insulators 23, 43 and 53 have a plurality of axially extending connection receiving compartments. In addition, all are formed of sheet insulating material and are open at opposite ends to receive axially therealong a joined lead and coil wire end or tap wire. Each of the several compartments within an insulator are laterally separated from adjacent compartments of such insulator by at least one layer of sheet insulating material and all of the compartments are separated from the lateral exterior of the individual insulator by at least one layer of a common sheet of insulating material.

For example, with reference to insulator 53, the material 75 which separates the compartments 153, 253 from the exterior of the insulator is the same piece of sheet insulating material that separates the two compartments 153, 253. On the other hand, an exterior common sheet of insulating material in the embodiments of FIGS. 4 and 5 is a sheet of insulating material that is initially separate from the compartment defining material.

In FIG. 5, the several compartments 76, 77, 78 are formed by a plurality of independent, substantially identical tubular sleeves 41 that are held together by a common exterior tubular sleeve 43. The sleeve 43 may be formed of a heat shrinkable material or from any other known insulating material sized to constrain sleeve 41.

In the FIG. 4, the interior compartments 37 are defined by, or formed of, a first sheet 45 of insulating material, three layers of which are joined along an axially extending seam at 47 (see FIG. 4a). The thus seamed sheet of insulating material 45 is then incased in an auxiliary sleeve of sheet material 49 which similarly is seamed or sealed along an axially extending seam at 51. Material 49 additionally may be spot welded to or continuously sealed along the seam at 47 and thus hold the two sheets of insulating material 45, 49 together.

The insulators depicted in FIGS. 4 through 6 may be fabricated according to the teachings of the aforementioned application Ser. No. 333,786, the subject matter of which is specifically incorporated herein by reference.

The just referenced co-pending application Ser. No. 333,786 teaches, inter alia, a method and apparatus for providing a continuously welded seam between layers of insulating material (e.g., polyethylene terephthalate) moving the strip material along an axis and ultrasonically welding or fusing two or more layers of the material together. Such a seam between two layers that would occur at 51 in FIGS. 4a and 4b is shown (to an enlarged scale in cross section) in FIG. 7.

The insulator 53 of FIG. 6 might be made by forming the strip material about two parallel axially extending rods and forming a continuous seam as indicated at 81 and 82 in FIG. 6b. It will be appreciated that a multi-barreled tube may be formed of indeterminate length and then cut into segments to form an insulator of a desired determinate length as illustrated in FIG. 6c.

The specific insulator configuration as well as the material from which the insulators 23, 41 and 43, and 53 are fabricated and the manner of fabrication may vary for different motor designs and applications. For example, one useful material is polyethylene terephthalate (e.g., MYLAR from Dupont). Other materials, including paper based materials of course also may be used. Fabrication may be by the aforementioned continuous seam ultrasonic welding process, or by cementing or other procedures.

The specific insulator illustrated as insulator 23 was made by using 0.005 inch thick MYLAR for the insulating sheet 45, and 0.003 inch thich MYLAR for auxiliary sleeve 49. In this example, the insulator had an axial length of 1.5 inches and a width for the three compartments of about ⅝ of an inch. The insulator 23, after placement over the tap and lead wire connection, is preferably placed at the break between two adjacent coils of an auxiliary winding (or of a main winding as shown in FIGS. 1 and 2). The insulator then preferably is tied, with the lead wires, firmly in place. Such tying or lacing may for example be performed by equipment such as disclosed in U.S. Pat. No. 3,659,337 the entire disclosure of which is specifically incorporated herein by reference.

It should be understood, however, that stator assemblies embodying the invention may be constructed with a multi-compartmented insulator positioned at the outer diameter (or periphery) of the stator windings, rather between the windings of two different phases as shown in FIGS. 1 and 2. In either event, the advantages of reduced consumption of lead wire, reduced volume of connections and leads in an end turn envelope, and reduced complexities of connection arrangements may be obtained. Moreover, lacing the insulated multiple connections in a desired location provides a good means of reliably anchoring such connections at a predetermined location relative to the remainder of the stator assembly and thereby both locating the connection in a desired manner and providing a stress relief for the connected portions of the lead wires. Moreover, it will be understood that four or more connections could be protected by a single four or more compartmented connector; or that combination of multicompartmented connectors may be used.

Thus, while the present invention has been described with respect to specific illustrated structures, numerous modifications will suggest themselves to those of ordinary skill in the art. For example, the insulator of FIG. 4a could be fabricated from but a single sheet of insulating material by continuing the outermost free end of sheet 45 at seam 47 counterclockwise about the exterior of the insulator.

Accordingly, the scope of the present invention is to be measured only by that of the appended claims.

What I claim as new and desire to secure by Letters Patent of the United States is:

1. A stator assembly for use in a dynamoelectric machine comprising a magnetic core having coil accommodating slots therein and at least one core end face; winding means comprising at least two coils of winding material having side turn portions disposed in selected slots of the core and having end turn portions extending beyond the at least one core end face; at least one tap wire extending from at least two coils; at least two lead wires with a first lead wire portion connected to a first tap wire portion and a second lead wire portion connected to a second tap wire portion; and a multi-connection protecting insulator for insulating the connected portions of the lead wires and tap wires; said multi-connection protecting insulator comprising insulating material arranged to define a plurality of longitudinally extending insulating compartments; the connected portions of the first tap wire and first lead wire being disposed in a first one of the compartments, and the connected portions of a second tap wire a second lead wire being disposed in a second one of the compartments; said multi-connection protecting insulator being formed of a sheet insulating material, and the first and second compartments being laterally separated from one another; the insulator includes a first tubular sleeve, and at least two insulating compartments are defined by second and third separate tubular sleeves, and the second and third separate tubular sleeves are disposed within the first tubular sleeve.

2. The invention of claim 1 wherein the first tubular sleeve is formed of a heat shrinkable material.

3. A stator assembly for use in a dynamoelectric machine comprising a magnetic core having coil accommodating slots therein and at least one core end face; winding means comprising at least two coils of winding material having side turn portions disposed in selected slots of the core and having end turn portions extending beyond the at least one core end face; at least one tap wire extending from each of the at least two coils; at least two lead wires with a first lead wire portion connected to a first tap wire portion and a second lead wire portion connected to a second tap wire portion; and a multi-connection protecting insulator for insulating the connected portions of the lead wires and tap wires; said multi-connection protecting insulator comprising insulating material arranged to define a plurality of longitudinally extending insulating compartments; the connected portions of a first tap wire and first lead wire being disposed in a first one of the compartments, and the connected portions of a second tap wire and second lead wire being disposed in a second one of the compartments; said multi-connection protecting insulator being formed of sheet insulating material, and the first and second compartments being laterally separated from one another; the plurality of insulating compartments are defined by a single sheet of insulating material.

4. A stator assembly for use in a dynamoelectric machine comprising a magnetic core having coil accommodating slots therein and at least one core end face; winding means comprising at least two coils of winding material having side turn portions disposed in selected slots of the core and having end turn portions extending beyond the at least one core end face; at least one tap wire extending from each of the at least two coils; at least two lead wires with a first lead wire portion connected to a first tap wire portion and a second lead wire portion connected to a second tap wire portion; and a multi-connection protecting insulator for insulating the connected portions of the lead wires and tap wires; said multi-connection protecting insulator comprising insulating material arranged to define a plurality of longitudinally extending insulating compartments; the connected portions of a first tap wire and first lead wire being disposed in a first one of the compartments, and the connected portions of a second tap wire and second lead wire being disposed in a second one of the compartments; said multi-connection protecting insulator being formed of sheet insulating material, and the first and second compartments being laterally separated from one another; the plurality of insulating compartments being defined by a single sheet of insulating material.

* * * * *